Figure 1:
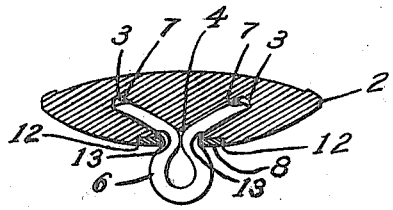

A. VOGELSANG.
BUTTON.
APPLICATION FILED FEB. 8, 1918.

1,270,467.  Patented June 25, 1918.

Inventor
Arthur Vogelsang
By Joseph P. Livermore
Attorney

UNITED STATES PATENT OFFICE.

ARTHUR VOGELSANG, OF WATERBURY, CONNECTICUT, ASSIGNOR TO WATERBURY BUTTON COMPANY, A CORPORATION OF CONNECTICUT.

BUTTON.

1,270,467.  Specification of Letters Patent.  Patented June 25, 1918.

Application filed February 8, 1918. Serial No. 216,071.

*To all whom it may concern:*

Be it known that I, ARTHUR VOGELSANG, a citizen of the United States, residing at Waterbury, in the county of New Haven and State of Connecticut, have invented an Improvement in Buttons, of which the following description, in connection with the accompanying drawings, is a specification, like reference characters on the drawings representing like parts.

This invention relates to a button of the kind in which a metallic shank comprising the button eye is secured in a head or body of other material such as vegetable ivory, bone, and the like, the purpose being to obtain a strong and durable union of the head with the shank portion of the button.

Figure 2:
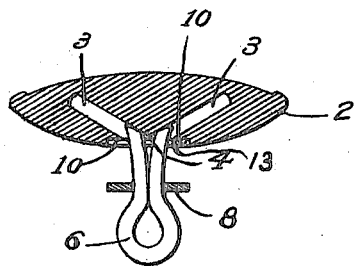
Figure 3:
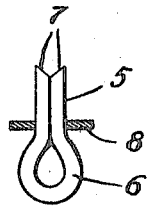
Figure 4:
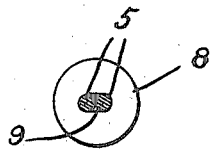

Figure 1, is a longitudinal section of a button embodying this invention, the shank and eye being shown in elevation;

Fig. 2, a sectional view of the head or body component and an elevation of the shank and eye component as it appears at the beginning of the operation of uniting the shank with the head;

Fig. 3, a side elevation of the shank and an associated binding plate as they appear before being united with the button-head; and, Fig. 4, a sectional view on line $x^4$, Fig. 3, showing the binding plate in plan view.

The head or body portion 2 of the button may be of any suitable or usual form and material, and is provided with two divergent passages 3, having a common entrance opening through lower surface of the button-head, said passages intersecting at the entrance so as to provide a wedge like portion 4 in the material of the button-head between them.

The shank 5, before being united with the button-head is of the form shown in Fig. 3, being in the nature of a metallic staple the folded end of which is contracted where it adjoins the prongs to produce an approximately circular eye 6, while the prongs lie substantially in contact with one another, and have their ends beveled at the adjacent sides as indicated at 7, the angle of the bevel being substantially the same as that of the wedge like projection 4 in the button-head.

Coöperating with the said shank portion is a binding plate 8 having an opening 9, preferably of the elongated shape shown in Fig. 4, the said opening being of proper size to fit snugly upon the prongs of the shank as best shown in Figs. 3 and 4, when said prongs are close together as shown in Fig. 4.

The shank is united to the head by forcing the prongs into the recesses 3 of the button-head. The beveled tips of the prongs encounter the wedge 4, which causes the prongs to spread and become deflected into the divergent passages 3.

The wedging action in thus spreading or separating the point ends of the shank prongs has a tendency to separate the shank prongs throughout their entire length and thus to spread or open the eye portion, but such action is prevented by the coöperation of the binding plate 8, which fits the prongs somewhat closely and is strong enough to withstand the force tending to separate the prongs.

As the shank portion is forced from the position shown in Fig. 3 to that shown in Fig. 1, relative to the button-head, the bending of the prongs takes place progressively from a point near the tip to a point near the eye, and thus tends to bend the prongs to a somewhat curved shape, the result being that as they are forced into the straight divergent passages in the button-head, the tips of prongs are finally bent to a condition in which they bear firmly against the lower surfaces of the divergent passages, while the portion of the shank near the eye bears against the upper surfaces of the passages which form the wedge 4, with the result that the prongs are frictionally held against any force tending to withdraw the prongs in the direction of the line of the passage in which it lies.

The binding plate 8 prevents any spreading or separation of the prongs adjacent to the eye, and when the shank prongs are finally fully entered into the recesses 3 of the button-head, the binding plate is close to the eye as shown in Fig. 1, and practically unites the contiguous sides of the eye with an effect substantially the same as that of an endless circular eye.

Preferably, although not necessarily, the lower face of the button-head is recessed as shown at 10, to receive the binding plate 8, practically flush with the under surface of the button-head, and if the head is so recessed the recess should be made a trifle larger than the binding plate to afford a slight clearance around the latter as shown at 12, Fig. 1, to prevent danger of straining or splitting the button-head, if it should contract or shrink, as may happen with some of the materials commonly used for buttons of this general character.

While contributing to obtain an effective engagement of the shank with the head in the operation of inserting the shank into the head, the binding plate 8, also greatly increases the strength of the union of the shank and head so that a much greater force would be required to pull the shank out from the button-head, than would be the case if no such binding plate were employed in coöperation with the other components of the button. If there were nothing further than the engagement of the prongs with the button-head in the recesses 3, any force or stress tending to pull the shank out from the button-head, would act first with a tendency to spread or open the eye which would bring a severe strain upon the comparatively weak corners at 13, Fig. 1, at the entrance to the passages 3 in the button-head so that a small force would be required to pull or break the shank out from button-head as compared with what is required when the binding plate 8 is a component of the article.

The binding plate effectively prevents any spreading of the eye or separation of the prongs adjacent to the eye and thus retains practically the full length of the divergent portions of the shank in the passages 3 of the button-head effective for retaining the union between the shank and head of the button.

While it is not the primary purpose of the binding plate, it also serves to make a pleasing finish at the junction of the button-head and eye, so that no washer for purely ornamental or finishing purpose is required, such as is sometimes used in buttons of the general character of the one herein shown and described.

I claim;

1. A button comprising a metallic shank and a head united thereto, the button-head having divergent passages entering from its lower surface, and the shank consisting of divergent prongs, frictionally engaged in said passages, and an eye portion external to the button-head uniting said prongs of the shank adjacent to the eye; and a binding plate confining said prongs in close proximity to one another at a point adjacent to the eye substantially as and for the purpose described.

2. A button comprising a metallic shank and a head united thereto, the button-head having divergent passages entering from its lower surface, and the shank consisting of divergent prongs frictionally engaged in said passages, and an eye portion external to the button-head uniting said prongs of the shank adjacent to the eye; and a binding plate confining said prongs in close proximity to one another at a point adjacent to the eye, the button-head having a recess in its lower face, and the binding plate being loosely seated therein, substantially as described.

In testimony whereof, I have signed the name to this specification.

ARTHUR VOGELSANG.

Copies of this patent may be obtained for five cents each, by addressing the "Commissioner of Patents, Washington, D. C."